United States Patent [19]
Wright, Sr.

[11] Patent Number: 5,686,005
[45] Date of Patent: *Nov. 11, 1997

[54] HEATED COMPUTER PAD

[76] Inventor: Dennis E. Wright, Sr., 6145 Furnace Rd., Ontario, N.Y. 14519

[*] Notice: The term of this patent shall not extend beyond the expiration date of Pat. No. 5,674,423.

[21] Appl. No.: 560,476

[22] Filed: Nov. 17, 1995

Related U.S. Application Data

[63] Continuation-in-part of Ser. No. 352,845, Dec. 2, 1994.

[51] Int. Cl.$^6$ .............. H05B 3/34; B43L 15/00; A61F 7/00
[52] U.S. Cl. ............ 219/549; 219/201; 219/217; 219/529; 219/544; 248/118.1; 248/918; 400/715; 601/15; 607/98; 607/111; 607/152
[58] Field of Search ............... 219/200, 201, 219/213, 217, 528–529, 544, 548, 549; 400/715; D14/114; 248/118, 118.1, 118.3, 118.5, 346, 633, 918; 607/98–99, 111, 152, 108–110, 96, 144; 601/15

[56] References Cited

U.S. PATENT DOCUMENTS

| | | | |
|---|---|---|---|
| D. 328,892 | 8/1992 | Miller | D14/114 |
| 2,844,696 | 7/1958 | Custer | 219/213 |
| 3,178,559 | 4/1965 | Fogel et al. | |
| 4,042,803 | 8/1977 | Bickford | 219/211 |
| 4,186,294 | 1/1980 | Bender | 219/528 |
| 4,187,844 | 2/1980 | Caprio, Jr. | 602/65 |
| 4,245,149 | 1/1981 | Fairlie | |
| 4,599,095 | 7/1986 | Barnes et al. | 219/548 |
| 4,628,188 | 12/1986 | Andreasson | |
| 4,661,689 | 4/1987 | Harrison | |
| 4,788,417 | 11/1988 | Graflind | |
| 4,868,898 | 9/1989 | Seto | |
| 4,891,501 | 1/1990 | Lipton | |
| 5,151,578 | 9/1992 | Phillips | |
| 5,160,828 | 11/1992 | Olsen | |
| 5,163,646 | 11/1992 | Engelhardt | 400/715 |
| 5,188,095 | 2/1993 | Healy | 601/61 |
| 5,228,655 | 7/1993 | Garcia et al. | 248/918 |
| 5,340,075 | 8/1994 | Schriner | 248/118 |
| 5,356,099 | 10/1994 | Sereboff | 248/918 |
| 5,445,349 | 8/1995 | Hart | 248/118 |
| 5,451,743 | 9/1995 | du Preez | 219/544 |
| 5,476,491 | 12/1995 | Mayn | 248/118 |
| 5,477,033 | 12/1995 | Bergholtz | 219/528 |
| 5,566,913 | 10/1996 | Prokop | 248/118 |
| 5,572,941 | 11/1996 | Amos | 248/118 |
| 5,599,280 | 2/1997 | Wolden | 248/918 |

FOREIGN PATENT DOCUMENTS

| | | |
|---|---|---|
| 0454184 | 10/1991 | European Pat. Off. |
| 64-54131 | 3/1989 | Japan |
| 203814 | 7/1992 | Japan ............ 219/548 |

*Primary Examiner*—Teresa J. Walberg
*Assistant Examiner*—Raphael Valencia
*Attorney, Agent, or Firm*—Nixon, Hargrave, Devans & Doyle

[57] ABSTRACT

A computer pad is heated for reducing repetitive motion stress and increasing comfort for a user and for providing potential therapeutic treatment by warming the hand(s) and/or wrist(s) of the user while operating a computer input device such as a mouse or a keyboard. The pad includes an electrical heating device such as a resistance-type heating element embedded in it. If a mouse is used as the input device, it can be either a stationary mouse or a conventional movably positioned mouse that is operated on the level section of the top surface of the pad's upper layer. If a stationary mouse or a keyboard is utilized, the user's hand(s) and/or wrist(s) can be supported by a suitably shaped area within an elevated section of the working surface of the pad. The lower layer of the pad may conveniently include a non-skid bottom surface. Conventional electrical controls such as, for example, a rheostat and/or thermostat are used to achieve and maintain the desired temperature range, and a standard, 120v electrical power outlet is employed as the power source. A heated computer apparatus comprises a computer keyboard and heating device that is close to the input device and the hand(s) and/or wrist (s) of the computer user. A computer keyboard is manually operated through a repetitive motion by the user, while at least a portion of the user's hand(s) and/or wrist(s) is heated to relieve stress induced by the repetitive motion.

18 Claims, 2 Drawing Sheets

HEATED COMPUTER PAD

CROSS-REFERENCE TO RELATED APPLICATION

This application is a continuation-in-part of prior application Ser. No. 08/352,845, filed Dec. 2, 1994, by Dennis E. Wright, Sr., entitled HEATED MOUSE PAD.

FIELD OF THE INVENTION

The present invention relates generally to a computer pad and, more particularly, to a pad that is heated for relieving repetitive motion stress and increasing comfort for a user and for providing potential therapeutic treatment for the hands and wrists of the user while operating a computer keyboard or mouse.

BACKGROUND OF THE INVENTION

It is the practice of computer operators, graphic artists and the like to actuate a stationary mouse or to actuate a movable mouse by sliding it horizontally about a surface. Conventional computer input devices such as a mouse or a keyboard have one or more buttons or keys that are spring biased in one direction and are operated by pressing the button or key in a direction opposed to the bias in order to make an electric contact within the device. Continuous operation of such a device over a substantial period of time can be fatiguing and discomforting, resulting in decreased speed of operation. Furthermore, the widespread proliferation of devices such as a computer mouse or keyboard has contributed to a significant increase in incidences of a repetitive motion stress injury known as carpal tunnel syndrome. Carpal tunnel syndrome is a serious condition that can lead to permanent damage of the nerves and joints and is often accompanied by tingling or numbness of a user's hands. It is known that such tingling and numbness comes from compression of the median nerve when the carpal ligaments move in a repetitive fashion, over a period of time, through the carpal tunnel in the wrist.

The present invention relates to the discovery that heat applied to the hands and/or wrists of the operator of a computer input device by a heated wrist rest and/or computer pad increases the comfort of the operator and may minimize the onset of carpal tunnel syndrome that can result from extensive sessions of using a computer input device such as a mouse or keyboard.

It is well known that heat can be used in the therapeutic treatment of injured muscles. Heat treatment pads are well known in the prior art. Examples of the prior art include the following: U.S. Pat. No. 4,891,501, issued Jan. 2, 1990 to Barry Lipton, is directed to a therapeutic pad for treating upper body muscles. U.S. Pat. No. 5,151,578, issued Sep. 29, 1992 to Jerry G. Phillips, is directed to an anisotropically bendable heating pad which remains flat when applied to a vertical body surface.

A pad that is heated and possesses antistatic properties so as to be useful in offices where computers are present is described in U.S. Pat. No. 4,661,689, issued Apr. 28, 1987 to John M. Harrison. However, the pad disclosed in this patent is configured as a floor heating pad or the like and does not provide for selective warming of a person's hands and/or wrists.

Other less relevant heating pad disclosures related to therapeutic treatment of the affected area by direct contact are described in U.S. Pat. No. 3,178,559, issued Apr. 13, 1965 to Mortimer A. Fogel et al., U.S. Pat. No. 5,160,828, issued Nov. 3, 1992 to Richard G. Olsen, and European Patent Application 0 454 184, published Oct. 30, 1991, Anthony J. Last, inventor.

Additional teachings of heating pads for chairs are found in U.S. Pat. Nos.: 4,256,149, issued Jan. 13, 1981 to Ian F. Fairlie; 4,628,188, issued Dec. 9, 1986 to Jan Andreasson; and 4,868,898, issued Sep. 19, 1989 to Hiroshi Seto. A pad for a mattress is taught in U.S. Pat. No. 4,788,417, issued Nov. 29, 1988 to Leif Graflind. A resistance element heating pad with a thick material base is disclosed in Japan Patent document 64-54131, dated Mar. 1, 1989.

None of the above inventions and patents, however, taken either singly or in combination, describe the present invention as claimed.

SUMMARY OF THE INVENTION

The present invention relates to a computer pad that is heated for reducing repetitive motion stress and increasing comfort for a user and for providing potential therapeutic treatment for the hand(s) and/or wrist(s) of the user while operating a computer input device such as a mouse or a keyboard. The pad includes an electrical heating means such as a resistance-type heating element embedded in it. If a mouse is used as the input device, it can be either a stationary mouse or a conventional movably positioned mouse that is operated on the level section of the top surface of the pad's upper layer. If a stationary mouse or a keyboard is utilized, the user's hand(s) and/or wrist(s) can be supported by a suitably shaped area within an elevated section of the working surface of the pad. The lower layer of the pad can conveniently include a non-skid bottom surface. Conventional electrical controls such as, for example, a rheostat and/or a thermostat can be used to achieve and maintain the desired temperature range, and a standard, 120v electrical power outlet is employed as the power source.

Also in accordance with invention, a heated computer apparatus comprises a computer keyboard and means for heating that is proximate the input device and the hand(s) and/or wrist(s) of the computer user. A process of the invention provides for manually operating a computer keyboard through a repetitive motion by the user, while at least a portion of the user's hand(s) and/or wrist(s) is heated to relieve stress induced by the repetitive motion.

Accordingly, it is a principal object of the invention to provide a heated computer pad for covering a work surface and for maintaining a warm environment for the hand(s) and/or wrist(s) of a user while operating a computer input device.

It is a further object of the invention to provide a heated mouse pad for a user operating a stationary mouse or a movably positioned mouse, whereby the muscles of the user's hand(s) and/or wrist(s) are potentially therapeutically treated during the operation of the mouse.

It is a further object of the invention to provide a heated mouse pad having a hand and wrist pad support for use with a stationary computer mouse.

Still another object of the invention is to provide a heated computer pad that enables an individual to operate a computer input device in a comfortable and convenient manner over long periods of time.

It is an object of the invention to provide improved elements and arrangements thereof in an apparatus that in inexpensive, dependable, and fully effective in accomplishing its intended purposes.

These and other objects of the present invention will be made readily apparent by the following specification and drawings.

DETAILED DESCRIPTION OF THE INVENTION

Figure 1:
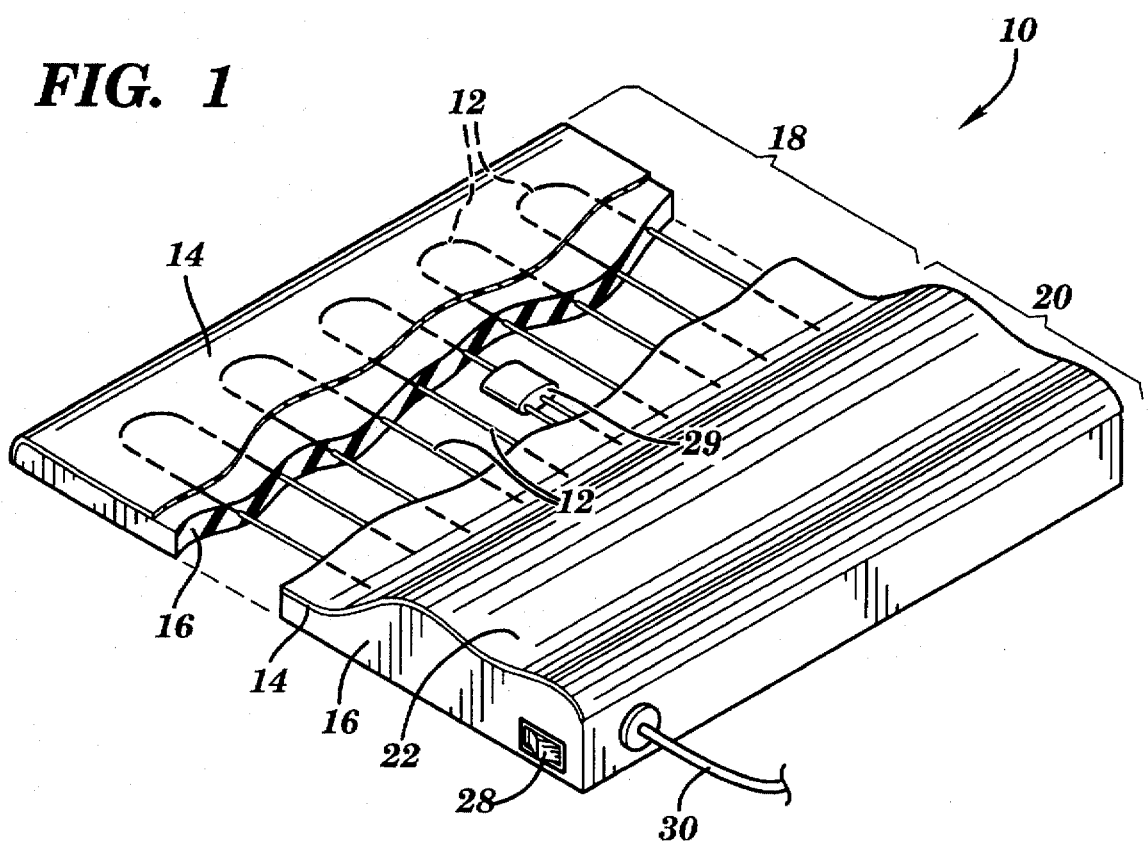
FIG. 1 is a perspective view of a heated computer pad of the invention, partially cut away to show an embedded heating element.

FIG. 1 illustrates one embodiment of the present invention, a heated computer pad 10 intended for use with a mouse. The view is partially cut away to reveal details of an embedded heating element 12. The pad 10 includes a thin upper layer 14 and a thick lower layer 16. The upper layer 14 is made of a fabric material such as vinyl fabric, canvas fabric, and the like. The top surface of the upper layer 14 is the working area of the pad 10 and includes a forward end 18, which is a substantially planar or level surface, and a rearward end 20, which has an elevated surface that includes an elongated, slightly depressed area 22 through approximately the middle of the rearward end 20. The planar surface of the forward end 18 constitutes approximately two-thirds of the area of the working surface. A computer stationary mouse 24 is positioned on the forward planar surface for its operation thereon. The remaining approximately one-third of the area of the working surface constitutes the elevated surface, with its depressed area 22, at the rearward end 20.

Figure 2:
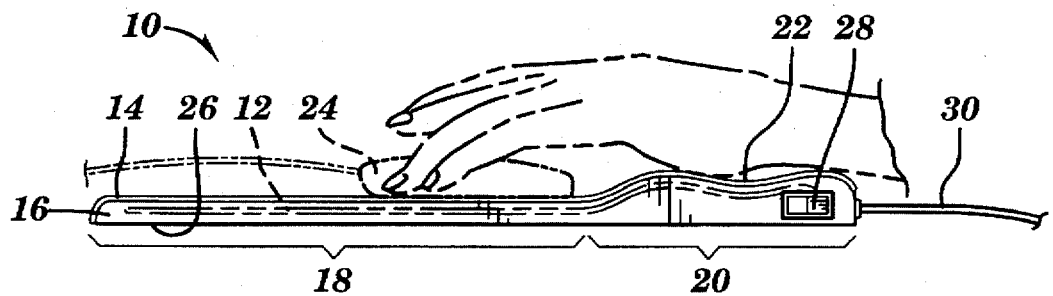
FIG. 2 is a side sectional view of the pad showing a stationary mouse and the hand and wrist of a user positioned on an elevated supporting section of the pad.

As illustrated in FIG. 2, the surface at the rearward end 20 has an elevational height that is substantially the same as the height of the top of the stationary mouse 24. The elevated surface with its elongated depression 22 is dimensioned and configured for supporting the curvature of a user's hand and wrist thereon. The lower layer 16 is made of a resilient rubber material. A bottom surface 26 of the lower layer 16 has a non-skid characteristic, whereby the bottom surface 26 remains firmly in place when the pad is positioned on a supporting surface such as a table or desk top.

For heating the pad 10, the electrical heating element 12 is embedded or molded within the lower layer 16. The electrical heating element 12 is a single, sinuously looped resistive heating wire. A thermal switch 28 or the like for controlling the heating element 12 is mounted on a side wall of the lower layer 16 and is electrically connected within the circuit. The heating wire element 12 is electrically connected via an electric power cord 30 to a conventional power outlet, e.g., 120 VAC (not shown). The working surface of the pad is heated to a temperature above room temperature but below the temperature that will cause burning of the skin of the computer user. A useful working surface temperature range for the appropriate operation of the heating pad 10 is about 90° to 106° F. (32° to 41° C.). This range is considered to be a desirable comfort zone for the user's hands and wrists, "not too cool and not too warm". Conventional rheostat and/or thermostat controls (not shown) can be incorporated within the electrical line to achieve and maintain the desired temperature range.

Figure 3:
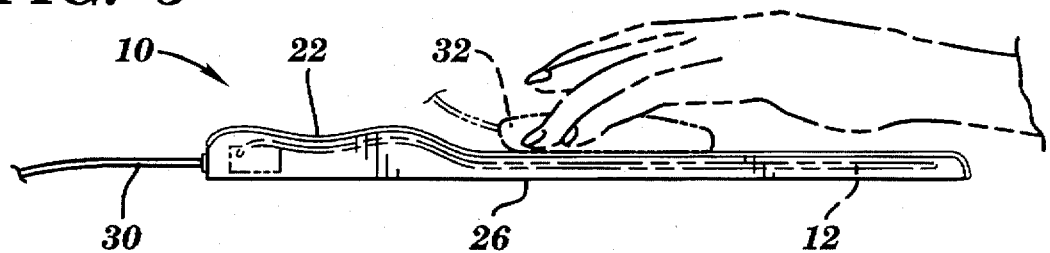
FIG. 3 depicts a reverse position of the pad in FIG. 2, showing a conventional movable mouse being operated thereon without utilizing the supporting section.

FIG. 3 illustrates the pad 10 in a reverse disposition relative to that shown in FIG. 2. This 180° rotation in the orientation of pad 10 provides for the mobility space required for a mouse 32 that is of the movably positioned type. Thus, in the FIG. 3 configuration of the invention, the rear elevated surface 20 is not utilized and the mobile mouse 32 can be freely moved about on the forward planar surface 18.

Figure 4:
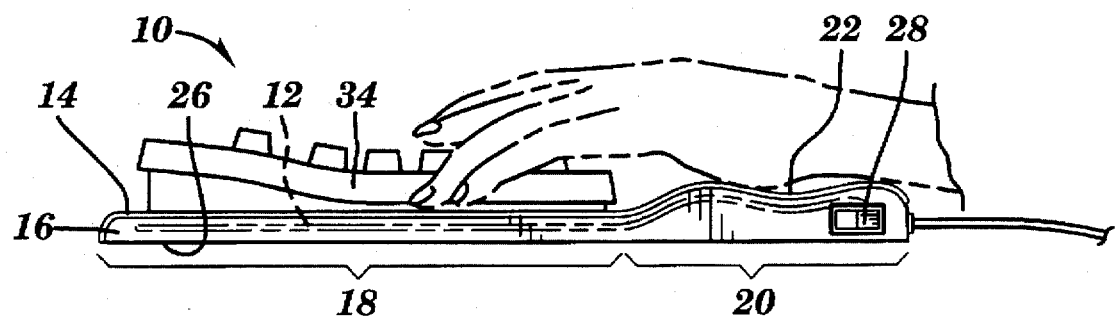
FIG. 4 is a side sectional view of a pad of the invention, showing a computer keyboard and the hand and wrist of a user positioned on an elevated supporting section of the pad.

FIG. 4 illustrates the use of a heated computer pad of the invention with a computer keyboard 34. The forward end 18 is disposed under keyboard 34; and the rearward end 20 is positioned directly in front of the lowermost row of keys of keyboard 34. Compared to the pad shown in FIG. 1, a pad intended for use with a keyboard is elongated so that the forward end 18 lies beneath substantially the entire keyboard 34, and the rearward end 20 of pad 10 lies along substantially the entire front edge of keyboard 34. The keyboard pad 10 can be held in position by the weight of keyboard 34 or by a non-skid bottom surface 26 of the lower layer 16, or by a combination thereof. Alternatively, pad 10 can be connected to keyboard 34 by fastening means such as clamps (not shown), or it can be permanently attached to the keyboard of a computer, including one intended for laptop use, in the course of manufacture of the keyboard.

A typical mouse pad constructed in accordance with the present invention is substantially square-shaped, as shown in FIG. 1. The pad dimensions are conveniently about 10 inches (25 cm) on a side, with a thickness of about ⅜ to ½ inch (9.5 to 12.5 mm). Thus, the elevated surface of the working area is about ¾ to one inch (19 to 25 mm) above the supporting desk or table top surface. The regulating controls associated with the electrical heating element maintain the temperature range for the pad from about 90° to 106° F. (32° to 41° C.).

One embodiment of the pad of the invention, suitable for use with a computer keyboard, is of similar construction to that of the mouse pad depicted in FIG. 1, except that one of the linear dimensions is extended to correspond substantially to the width of a standard computer keyboard. Such a keyboard pad would conveniently be of rectangular shape, approximately 10×18 inches (25×46 cm), the elevated surface 20 being lengthened to conform to the width of the keyboard.

Figure 5:
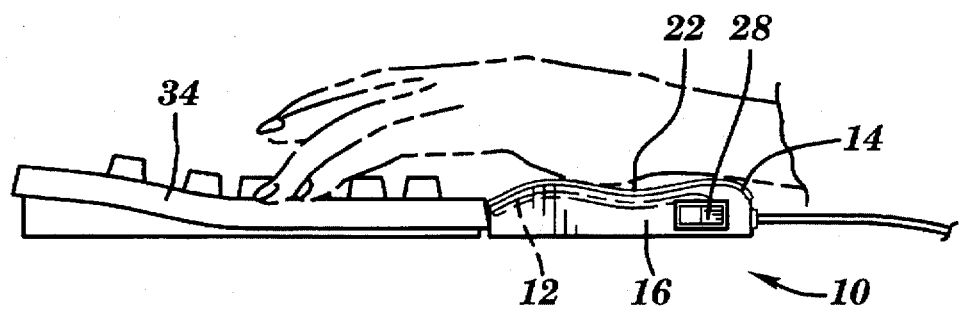
FIG. 5 is a side sectional view showing computer keyboard and the wrist of a user positioned on another embodiment of the heated pad of the invention.

Another embodiment of the present invention, also suitable for use with a computer keyboard, is shown in FIG. 5. In this embodiment, the heated pad 10 has an elongated rectangular configuration whose length dimension corresponds to the width of the computer keyboard 34. As with the other embodiments, an electrical heating element 12 is contained within the lower layer 16. The top surface 22 of upper layer 14, which provides support for the user's wrist, can be planar, or it can include a depression 22, as depicted in FIG. 5.

The pad 10 shown in FIG. 5 is positioned directly in front of and parallel to the lowermost row of keys and can be held in place by a non-skid bottom surface 26 of the lower layer 16. Alternatively, pad 10 can be removably connected to keyboard 34 by fastening means such as clamps (not shown), or it can be permanently attached to the keyboard of a computer, including one intended for laptop use, in the course of manufacture of the keyboard.

It is to be understood that the present invention is not limited to the embodiments described above, but encompasses any and all embodiments within the scope of the following claims.

I claim:

1. A heated computer pad which reduces. repetitive motion stress and increases comfort for a user and which provides potential therapeutic treatment by warming at least a portion of a user's hands and wrists while operating computer input means, comprising:

an upper layer and a lower layer;

a working surface on said upper layer, said working surface having a forward and a rearward end, said working surface being planar at said forward end, said planar working surface at said forward end being adapted to receive said computer input means thereon, said rearward end having an elevated portion adapted to support at least a portion of a user's hands and wrists;

four peripheral edges, each having a substantially uninterrupted surface:

electrical means for heating said pad, said electrical means being connected to an electrical power cord that extends from the surface of only one of said peripheral edges; and control means associated with said electrical means for providing appropriate heat regulation and power thereto.

2. A heated computer pad according to claim 1, wherein said pad is adapted to receive computer input means selected from the group consisting of a keyboard and a mouse.

3. A heated computer pad according to claim 1, wherein said electrical means comprises resistive heating wire, said wire being situated in said lower layer and being connected to an electrical power source.

4. A heated computer pad according to claim 1, wherein said control means comprises a rheostat.

5. A heated computer pad according to claim 1, wherein said control means comprises a thermostat.

6. A heated computer pad according to claim 1, wherein said control means comprises a switch.

7. A heated computer pad according to claim 1, wherein said lower layer of said pad includes a non-skid bottom surface for engagement with a supporting surface.

8. A heated computer pad according to claim 1, wherein said electrical means and said control means provide for heating said working surface of said pad to a temperature above room temperature but below the temperature that will cause burning of the skin of a user.

9. A heated computer pad according to claim 8, wherein the temperature of said working surface is about 90° C. to 106° C. (32° to 41° C.).

10. A heated computer pad according to claim 1, wherein said upper layer is made of a fabric material.

11. A heated computer pad according to claim 10, wherein said fabric material is a vinyl fabric or a canvas fabric.

12. A heated computer pad according to claim 1, wherein said lower layer is made of a rubber material.

13. A heated computer pad according to claim 1, wherein said working surface at said rearward end is configured as an elevated area.

14. A heated computer pad according to claim 13, wherein said elevated area includes a depression dimensioned and configured for supporting at least a portion of a user's hands and wrists.

15. A heated computer input apparatus which reduce, repetitive motion stress and increases comfort for a user and which provides potential therapeutic treatment for at least a portion of a user's hands and wrists, while operating the apparatus, comprising:

a computer keyboard for inputting data to a computer by repetitive operation;

heating means proximate said computer keyboard and proximate the at least a portion of a user's hands and wrists and which heats at least a portion of a user's hands and wrists to reduce stress incurred by repetitive operation of said computer keyboard.

16. The heated computer input apparatus according to claim 15, wherein said heating means comprises a heated pad for supporting at least a portion of a user's wrists, said heated pad comprising:

an upper working surface; a non-skid bottom surface; four peripheral edges, each having a substantially uninterrupted surface; and an electrical heating element incorporated in the pad and provided with an electrical power cord that extends from the surface of only one of said peripheral edges.

17. A process for inputting data to a computer which simultaneously treats stress to a least a portion of a computer user's hands and wrists resulting from repetitive motion by a user, comprising:

manually operating a computer keyboard that is operated by a repetitive motion by a user, and heating at least a portion of a user's hands and wrists during said operating of said computer keyboard.

18. A process according to claim 17, wherein at least a portion of a computer user's hands and wrists is heated at a temperature high enough to relieve stress induced by the repetitive motion of operating said computer keyboard.

* * * * *

UNITED STATES PATENT AND TRADEMARK OFFICE
CERTIFICATE OF CORRECTION

PATENT NO. : 5,686,005

DATED : November 11, 1997

INVENTOR(S) : Wright Sr.

It is certified that error appears in the above-indentified patent and that said Letters Patent is hereby corrected as shown below:

Claim 9, line 2, replace "C" with --F--; line 3, replace first occurrence of "C" with --F--.

Signed and Sealed this

Seventh Day of July, 1998

Attest:

BRUCE LEHMAN

Attesting Officer

Commissioner of Patents and Trademarks